April 9, 1957 W. D. CALDWELL 2,788,519
POSITION INDICATING DEVICE
Filed Dec. 10, 1954 5 Sheets-Sheet 1
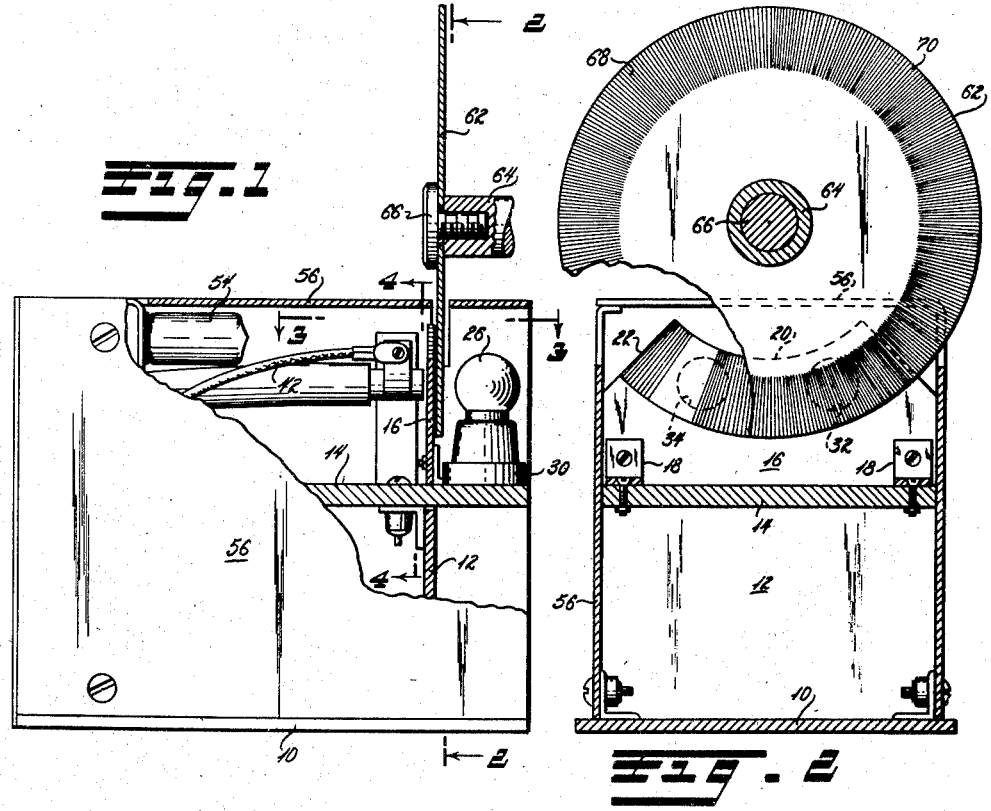
Fig. 1
Fig. 2
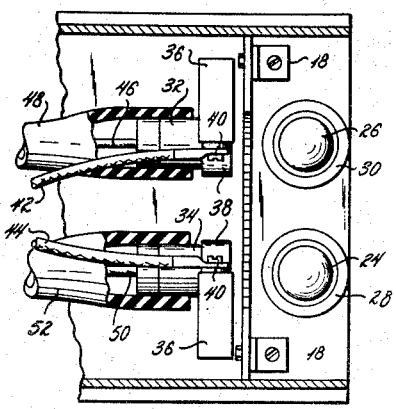
Fig. 3
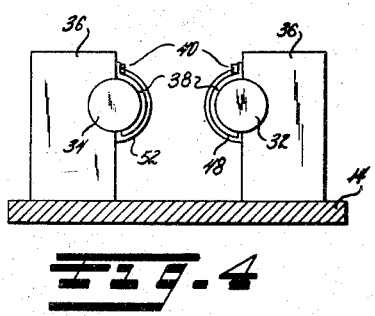
Fig. 4
INVENTOR
WYCHE D. CALDWELL
BY Strauch, Nolan & Diggins
ATTORNEYS April 9, 1957 W. D. CALDWELL 2,788,519
POSITION INDICATING DEVICE
Filed Dec. 10, 1954 5 Sheets-Sheet 2
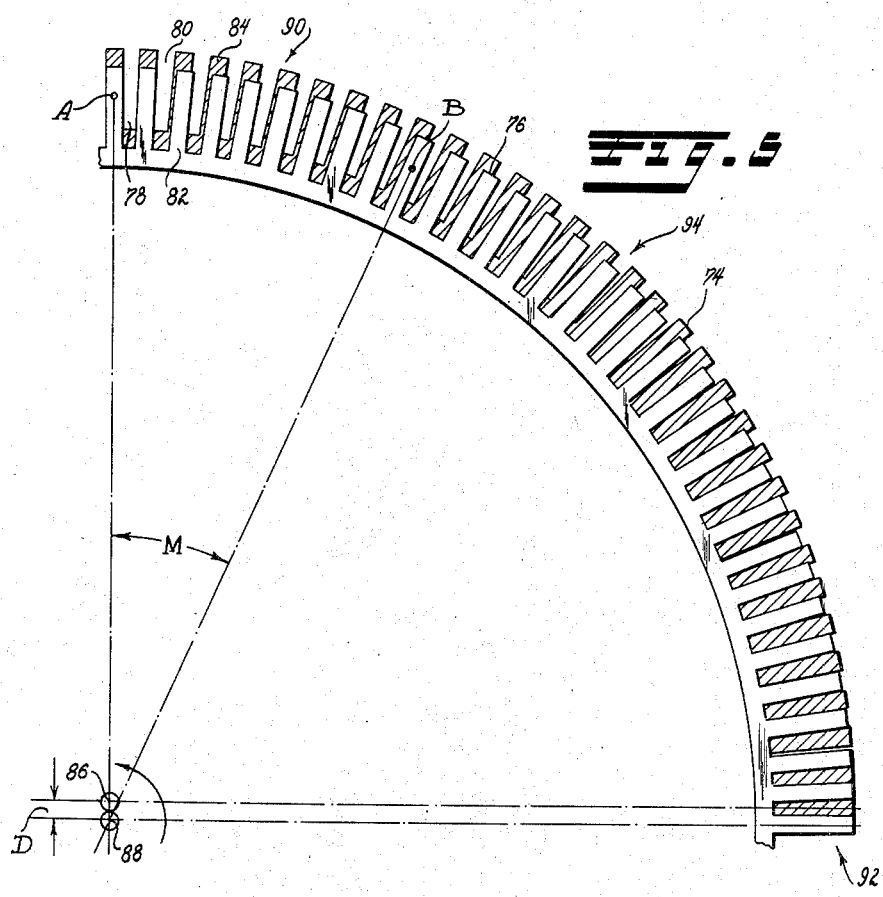
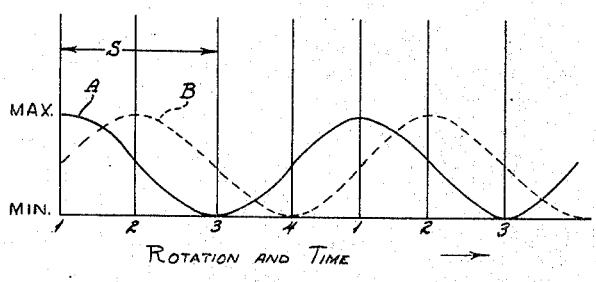
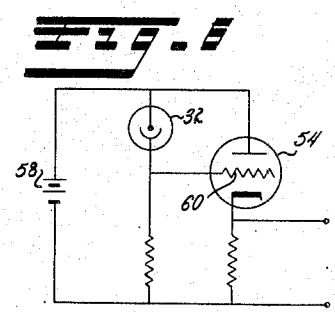
INVENTOR
WYCHE D. CALDWELL
BY Strauch, Nolan & Diggins
ATTORNEYS

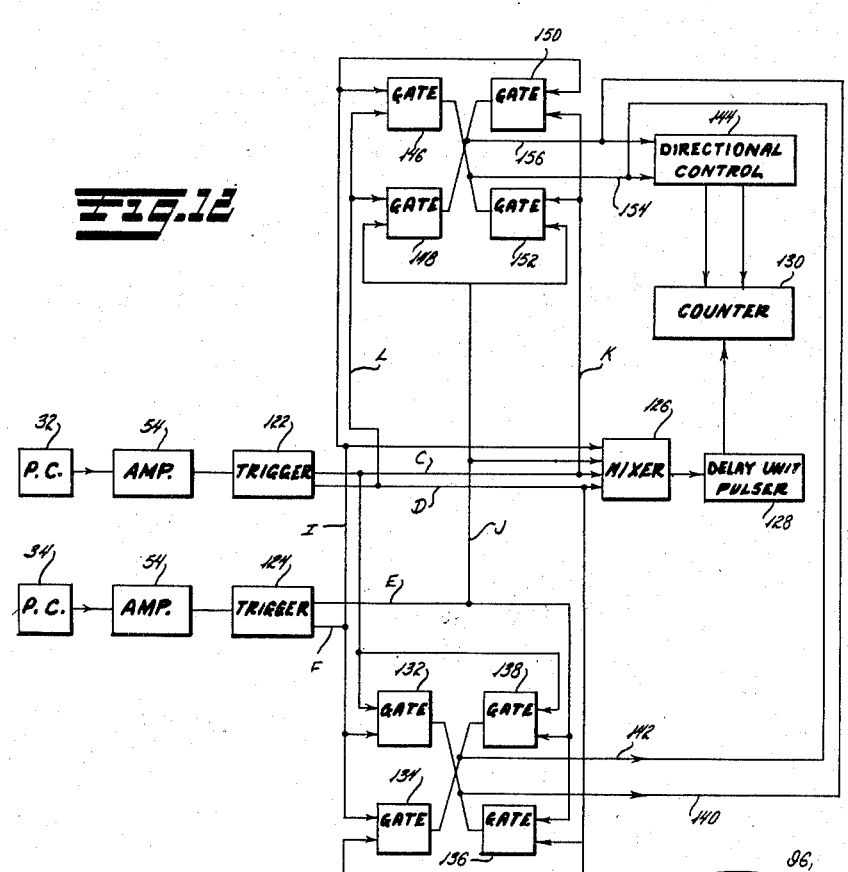

April 9, 1957 W. D. CALDWELL 2,788,519
POSITION INDICATING DEVICE
Filed Dec. 10, 1954 5 Sheets-Sheet 4

INVENTOR
WYCHE D. CALDWELL

BY Strauch, Nolan + Diggins
ATTORNEYS

April 9, 1957 W. D. CALDWELL 2,788,519
POSITION INDICATING DEVICE
Filed Dec. 10, 1954 5 Sheets-Sheet 5

INVENTOR
WYCHE D. CALDWELL
BY Strauch, Nolan & Diggins
ATTORNEYS

2,788,519

POSITION INDICATING DEVICE

Wyche D. Caldwell, Burbank, Calif., assignor to Telecomputing Corporation, Burbank, Calif., a corporation of California Application December 10, 1954, Serial No. 474,533

10 Claims. (Cl. 340—271)

This invention relates to a position indicating device and more particularly to an instrument for deriving positional information from any movement and converting this information into digital form. This movement can be represented by rotational movement imparted to the indicating device and any particular rotational position imparted can represent a polar coordinate of an instrument or tracking device. Also, the rotational position imparted to the instrument can be derived from and represent the linear movement of various instruments or other mechanisms. The invention makes it possible to obtain at all times the exact position of any element whose function is being considered.

In the past it has been the practice to follow the position of any element by utilizing its movement to cause rotation of a part of a counter to thereby obtain a count of increments of movement. Where it was desired to know the direction in which the element was moving, it was necessary to utilize a mechanical arrangement in connection with the counter which required physical connection to the rotating parts of the counter. Such a connection imposed undesirable torque loadings on the rotating parts of the counter and certain lags had to be built into this physical connection to be sure that the directional information preceded the counting information. Such physical means of determining direction were subject to frequent maladjustments and calibration of the counting instrument was continually necessary.

In order to overcome these disadvantages of such mechanical devices, various photoelectric position indicating instruments were developed. Most such instruments were specialized in their application and were designed either for determining the relative angular velocity and phase of two revolving parts or for determining an angle of movement through a measurement of variations in the intensity of a light source. In addition to these types of instruments, there is disclosed in Patent No. 2,685,082, owned by applicant's assignee, a photoelectric means for measuring angular movements while simultaneously providing an automatic indication of direction of movement.

The three most important requirements of a photoelectric position indicating device comprise; sensing and providing an automatic indication of the direction of rotation, transmitting an adequate amount of light and providing high positional resolution. Early developments employed a circular disc containing a large number of alternate transparent and opaque radial lines, and this disc was photosensitively viewed through a radially aligned slit having a width equal to the width of a single line on the disc. Upon rotating the disc the slit was alternatingly opaque and transparent as the opaque and transparent radial lines upon the disc passed thereby. When a transparent line lay opposite the slit maximum light was transmitted to the photosensitive device, and when the disc was rotated through a distance of one line width, minimum light was transmitted to the photosensitive device. As an alternative to the foregoing method, it was also possible to utilize two concentric discs, each of which had equally spaced lines alternatingly opaque and transparent which were juxtaposed. When one of these disc was rotated light either passed through or was blocked as in the aforedescribed disc and slit arrangement. In practice, either of these arrangements could be made to met the requirements of adequate light transmission and high resoultion. It was virtually impossible, however, to utilize such devices to provide directional sense.

The aforementioned patent, 2,685,082 of applicant's assignee, discloses one attempt at solution of this problem. Thus, there is disclosed a disc having relatively large opaque areas and equally large transparent areas. This disc was arranged in juxtaposition to a plate having a pair of laterally displaced slits therein which permitted two phototubes to be actuated by light from a source on the opposite side of the disc and plate. Upon rotation of the disc first one and then both phototubes were blacked out the sequence depending upon the direction of rotation. While this device was completely satisfactory from the standpoint of light transmission and direction sensing, it was not capable of providing the high resolution desired because of mechanical difficulties presented by the relative sizes of the slits and the phototubes. With a disc of practical size the number of slits, and hence the resolution, was definitely limited by the size of available phototubes. An extremely high resolution was impossible.

According to the present invention there is provided a device which satisfies all three of the requirements of photoelectric position indicating devices. That is, a means is provided for automatically sensing the direction of rotation, transmitting an adequate amount of light and providing an extremely high positional resolution. No measurement of relative light intensity is involved nor does the size of the photocells impose any limitation upon the degree of resolution possible.

In order to accomplish these purposes, there are provided a pair of discs each having a number of uniformly spaced radial lines defining alternately opaque and transparent areas and these discs are mounted in juxtaposed position between a light source and a pair of spaced photosensitive devices. According to a basic discovery of the invention the discs are juxtaposed in such a manner that their axes are displaced by a finite distance equal, for example, to the width of one line or space. With this type of mounting any given pair of lines on the two discs may be made to overlay one another while a similar pair of lines located 90° from the first pair is interlaced. In the angular area between the two pairs of lines there is a varying degree of overlap or interlace which results, in the case of a one width axis spacing, in four large circumferentially arranged bands of light and dark areas. It has been further discovered that by displacing the axes by still greater distances, as for instance three or four line widths, still large numbers of shadow bands may be produced. If one of the two discs is rotated through an angle equal to the width of a line or space those areas which were dark become light and those which were light become dark. If the one disc is then further rotated through an additional angle equal to the width of a line or space, the originally light areas again become light and the originally dark areas again become dark so as to complete a cycle.

In the arrangement where the axes of the two discs are displaced by an amount equal to the width of one line or space so as to produce two light and two dark shadows areas, a rotation of one disc through an angle equal to the width of a line or space results in a 90° shift of the dark and light areas. When it is considered that there is no resolutional limitation due to photocell or slit size or other mounting arrangements, it will be seen that an extremely high degree of resolution may be provided.

The shadow or interference bands achieved by the concentric mounting of the two discs of this invention makes possible a device which meets all of the three requirements previously described. Thus phototubes of reasonable dimensions can sense the passage of the interference patterns to provide direction sense. Adequate light is transmitted through the interstitial bands and the rapid progression of revolving bands may be detected by the phototubes and counted in conventional counter circuits.

It is accordingly a primary object of the present invention to provide a photoelectric position indicating device capable of automatic direction sensing, high light transmission and high positional resolution.

It is another object of the present invention to provide a photoelectric position indicating device using spaced photocells for detecting the presence or absence of light for discrete counting purposes.

It is another object of the present invention to provide a photoelectric position indicating device which produces relatively broad shadow or interference patterns which actuate photoelectric cells for discrete counting purposes while simultaneously providing direction indication.

It is another object of the present invention to provide a photoelectric position indicating device utilizing a pair of eccentrically mounted discs or their equivalents for providing relatively broad shadow or interference patterns.

It is another object of the present invention to provide a photoelectric position indicating device utilizing eccentrically mounted discs or their equivalents wherein such discs have an equal number of uniformly spaced radial lines which act to progressively pass or prevent the passage of light to a photoelectric cell.

It is another object of the present invention to provide a photoelectric position indicating device utilizing a pair of eccentrically mounted discs having equal numbers of uniformly spaced radial lines thereon which coact to pass or prevent the passage of light to a pair of photoelectric cells for discrete counting and direction sensing purposes.

It is another object of the present invention to provide a position indicating device producing relatively broad interference patterns which move at a high speed in relation to the movement being indicated for discrete direction sensitive counting purposes.

Further objects and advantages of the invention will become apparent upon reference to the specification and claims and the appended drawings wherein:

Figure 1 is an elevational view of the reading head of this invention showing the photocells and rotating disc;

Figure 2 is a vertical section taken along line 2—2 of Figure 1 illustrating the lines in the rotating disc and the position of the photocells;

Figure 3 is a horizontal sectional view taken along line 3—3 of Figure 1;

Figure 4 is a vertical sectional view taken along line 4—4 of Figure 1 illustrating the means for mounting the photocells;

Figure 5 illustrates a pair of radially lined discs showing the areas of light transmission and non-transmission;

Figure 6 illustrates the circuit for one photocell and associated amplifier;

Figure 7 is an illustration of the shadows or interference patterns obtained with one arrangement of discs;

Figure 8 is an illustration of the shadows or interference patterns obtained with another arrangement of discs;

Figure 9 is a graphical illustration of the output of each photocell during rotation of the disc;

Figure 12 shows the circuit utilized to double the number of counts received from the two photocells.

Figure 10:
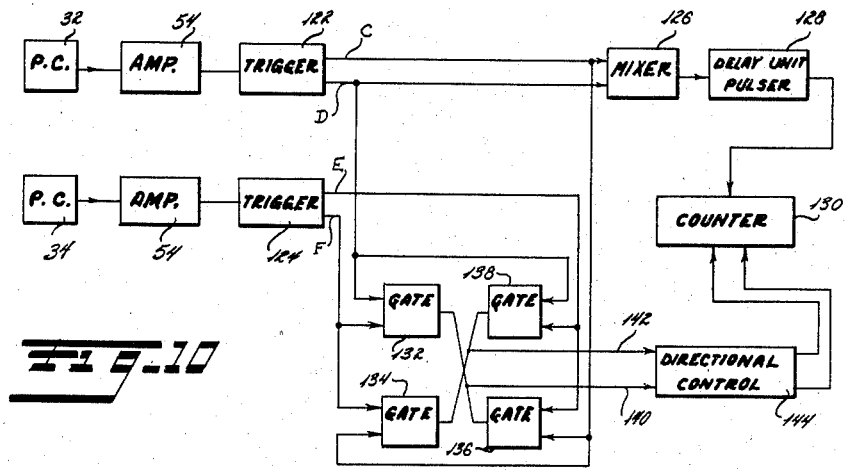
Figure 10 illustrates the circuit for utilizing the output of the photocells to indicate position.

Referring more particularly to the figures of the drawing, there is shown in Figures 1 and 2 a reading head constructed according to one embodiment of the invention. The reading head has a base plate 10 to which is secured a support bracket 12 which serves to support a mounting plate 14. A light shield 16 is secured to the mounting plate 14 by means of brackets 18. The light shield 16 has an arcuate upper edge 20 provided with a plurality of radial lines 22 thereon. The light shield 16 may be conveniently formed of a transparent material so that the lines 22 form alternate and substantially equal sized opaque and transparent areas.

A pair of light source lamps 24 and 26 mounted in sockets 28 and 30 are supported upon the mounting plate 14 at one end thereof. A photocell 32 is positioned directly opposite the lamp 26 and a photocell 34 is positioned directly opposite the lamp 24. Each photocell is mounted upon a support member 36 and is secured thereto by means of a spring clamp 38 which is attached to the support member 36 by means of a screw 40. While a pair of light source lamps is illustrated it will be apparent that a single centrally spaced lamp could be used.

A pair of leads 42 and 44 communicate with the clamps 38 to provide one lead for each photocell. The photocell 32 has a further output lead 46 which is surrounded by a rubber tube 48 to protect it from external electrical contact. The photocell 34 has a similar output lead 50 which is likewise surrounded by a rubber tube 52. The leads from both of the photocells pass to the amplifier 54 where the signals from each photocell are amplified sufficiently to be of further use. The entire photocell assembly is surrounded on three sides by thin shields 56 which are carried by base plate 10.

The electrical circuit for photocell 32 is illustrated in Figure 6 and a single source of electrical energy 58 is utilized for both the photocell 32 and the amplifier 54. The output of the photocell is shown directly connected to the grid 60 of the amplifier. The circuit for photocell 34 is exactly the same and it is to be understood that the output of both photocells may be amplified by a single tube of the twin type.

A circular disc 62 is mounted on a rotating shaft 64 by means of screws 66 and the disc is so positioned that a portion of its circumference is placed between the lamps 24 and 26 and the photocells 32 and 34. The circumference of the disc contains a series of radial opaque lines 68 which are spaced apart by transparent disc segments 70. The opaque lines and transparent segments 68 and 70 are of such length that they allow light to pass from the lamps 24 and 26 to the photocells 32 and 34 through the disc 62 and light shield 16 when the disc and light shield are properly positioned. The circumference of disc 62 is so positioned that the opaque lines 68 are capable of cooperating with the opaque lines on the light shield 16 to disrupt the view of lamps 24 and 26 by photocells 32 and 34. The width of each opaque line is approximately equal to the width of the transparent intervening segment of the disc and the same relationship is true of the opaque lines and transparent segments upon the light shield 16. The opaque lines upon the light shield 16 are radial in nature and lie upon the circumference of a circle having an equal diameter to the circle upon whose circumference the lines on the disc 62 lie. The light shield 16 is so arranged that the common center of the lines 22 is eccentrically located with respect to the axis of the shaft 64 upon which the disc 62 rotates. In effect the light shield 16 comprises a segment of a disc eccentrically mounted with respect to the disc 62.

Figure 13:
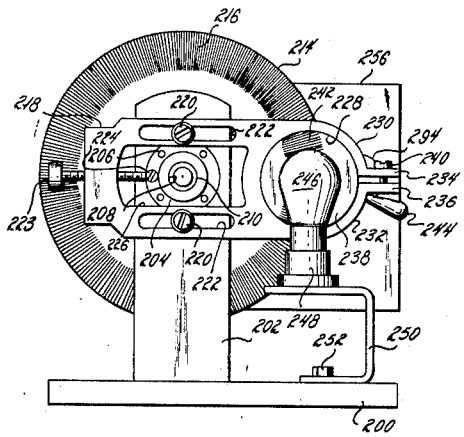
Figure 13 is a front elevation of another embodiment of the reading head of this invention showing the rotating disc and light shield.
Figure 14:
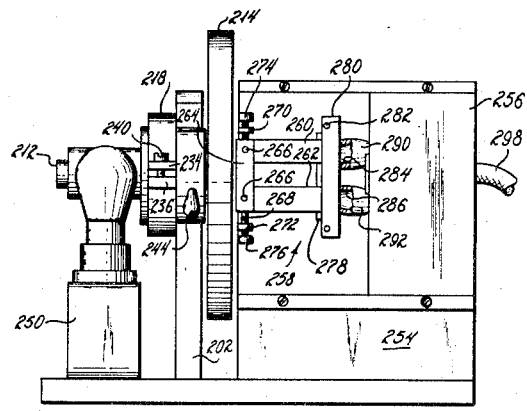
Figure 14 is a side elevation of the reading head of Figure 13 showing the photocells.
Figure 15:
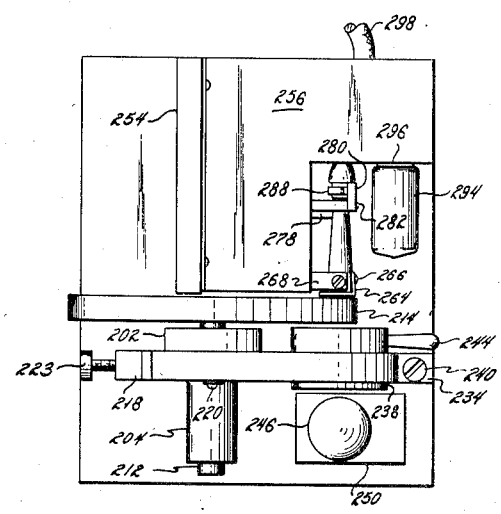
Figure 15 is a plan view of the reading head of Figures 13 and 14.

Referring more particularly to Figures 13, 14 and 15 there is shown another embodiment of the reading head constructed according to the invention. The reading head has a base plate 200 to which is secured a support bracket 202 which serves as a support for a bearing assembly 204 secured thereto by means of screws 206. The bearing assembly 204 has an inner bore 208 within which is mounted a bearing 210 for supporting a shaft 212. A transparent plastic disc 214 is carried by the shaft 212 for rotation about its longitudinal axis. A photographic film having a large plurality of radial lines 216 is cemented upon the front surface of the disc 214 concentric therewith. The photographic film may, as an example, have one thousand radial lines thereon which are .004 inch wide with approximately .006 inch of dark space therebetween.

A movable support arm 218 is adjustably secured to the support bracket 202 by means of a pair of screw assemblies 220 which pass through elongated slots 222 in the support arm 218. An adjusting screw 223 is provided in one end of the arm 218 and is rotatably secured in the base of the bearing assembly by means of a set screw 224. The support arm 218 has a cut away portion 226 and has a circular aperture 228 in the opposite end thereof. This end of the support bar is bifurcated and is provided with a pair of arcuate arms 230 and 232 which terminate in lugs 234 and 236 in order to provide an adjustable mounting for the light shield 238. A screw 240 is provided between the lugs 234 and 236 to permit locking of the light shield 238 in any desired position.

The light shield 238 consists of a circular plastic disc upon which is mounted a photographic film having a plurality of radial lines 242 thereon. A handle 244 is provided on the plastic disc 238 to permit rotational adjustment of the disc within the support arm 218. By manipulating the arm 244 to rotate the disc 238 the center of the radial lines 242 may be placed on a horizontal line passing through the axis of the shaft 212. The screw 223 may then be adjusted to off-set the center of the radial lines 242 the desired distance from the center of the shaft 212 in order to provide the desired eccentricity of the two sets of radial lines. A lamp 246 mounted in socket 248 is carried by bracket 250 secured to the base plate 200 by means of a bolt 252.

A vertical standard 254 is mounted on the base plate 200 to the rear of disc 214 and has mounted thereon an L-shaped cabinet 256. A photocell assembly 258 is mounted upon the side of the cabinet 256 in the following manner. A pair of transparent plastic light guides 260 and 262 are secured together at one end thereof by means of an angular mask plate 264 and screws 266. A U-shaped clamp 268 mounted upon the vertical wall of the cabinet 256 and having horizontal arms 270 and 272 adjustably supports the mask plate 264 and light guides 260 and 262 through adjustable screws 274 and 276.

The other ends of the light guides 260 and 262 are carried by a support block 278 and are fastened thereto by means of plate 280 and screws 282. A pair of photocells 284 and 286 are secured to the plate 280 by means of the clamps 288. The photocells 284 and 286 have their rearward portions covered by means of rubber sleeves 290 and 292 which extend into the cabinet 256. The mask plate 264 allows the photocell to view only that portion of the disc 214 which contains a particular interference shadow band. Preferably light from an area equal to one interference band width is conducted through the upper light guide 260 to the phototube 284 while light, or darkness, is conducted through the lower light guide 262 to the second phototube 286. An amplifier 294 is provided in a socket 296 in the cabinet 256, the tube 294 being removed in Figure 14 to permit a clear view of the photocell assembly. The output from the reading head passes through cable 298 to the apparatus for utilizing the signals in directional counting.

Referring to Figure 5 there are shown a pair of equal diameter discs 74 and 76 having radial slits 78 and 80 and arcuate segments 82 and 84 arranged on the circumference thereof. For purposes of clarity the disc 74 and segments 84 are cross hatched. The width of the slits 78 and 80 is substantially equal to the width of the arcuate segments 82 and 84. The disc 74 is mounted on a center 86 which is displaced by a distance D from the center 88 of the disc 76. When the discs are so arranged it will be seen that the slits 78 and 80 are superposed at position 90, while the arcuate segments 82 and 84 are interlaced at a second position 92 which is 90° removed from the position 90. At an intermediate position 94 the arcuate segments 82 and 84 are partially interlaced.

If a light source is placed behind the discs 74 and 76 as shown in Figure 5, shadows or an interference pattern will be produced consisting of light areas 96 and 98 and dark areas 100 and 102, as shown in Figure 7. Upon rotation of one of the discs 74 or 76 through an angle equal to the width of an arcuate segment, the interference pattern is reversed so that the light areas 96 and 98 are then dark while the dark areas 100 and 102 are light, corresponding to a rotation of the interference pattern through an angle of 90°. If a photocell A is placed opposite the area 90 and a photocell B is placed approximately opposite the area 94 and one disc rotated, each photocell will produce a periodically varying current which will, for convenience, be considered as a sine wave.

Referring to Figure 9, when the discs 74 and 76 are in the relative positions shown in Figure 5, the photocell A produces a maximum voltage indicated by the solid curve A at position 1 in Figure 9. When the uppermost disc 76 is rotated in a counterclockwise direction, the segments 82 and 84 begin to interlace and when the disc 76 has been rotated through an angle equal to one half of the width of the segments 82, the voltage output from the photocell A is equal to one-half its maximum value as shown at point 2 in Figure 9. As rotation is continued the segments 82 and 84 become completely interlaced after a rotation equal to the width of the segments and this condition is shown at point 3 in Figure 9. As rotation of the disc 76 continues the voltage produced by the photocell A varies periodically from maximum to minimum.

Simultaneously with this action of photocell A, the photocell B picks up a voltage the value of which is determined by the angular placement of the photocell B away from the photocell A. Thus where the photocell B is removed through an angular distance M from the photocell A, as shown in Figure 5, the photocell B produces one half of its maximum voltage at the instant that the discs 74 and 76 are in the positions shown in Figure 5 and this is indicated at position 1 by the dotted curve B in Figure 9.

As the disc 76 rotates in a counterclockwise direction, the slits 78 and 80 at the position of the photocell B tend to overlay one another so that the voltage produced by the photocell B increases to a maximum at position 2 and thereafter continues to vary between a maximum and minimum as shown in Figure 9. Because of the direction in which the disc 76 has been moved, it is apparent that curve A for photocell A will lead curve B for photocell B. If, however, the direction of rotation of disc 76 is reversed, it will be apparent that curve B for photocell B will lead curve A for photocell A.

It is therefore possible to use photocell A as a means of counting the number of light areas 96 and 98 which move past it and to use photocell B to determine the direction in which the disc is moving. The manner in which the signals from the two photocells is utilized for directional counting is illustrated in Figure 10, presently to be described.

It is apparent from the interference pattern shown in Figure 7 that the photocells A and B may be located at relatively widely spaced points and that therefore the dimensions of the photocells impose no limitation upon the number of slits and consequently the resolution which may be obtained. While the discs illustrated in Figure 5 are shown as being slitted, this has been for illustrative purposes only, it being ordinarily more desirable to utilize solid discs having opaque lines and transparent spaces therebetween.

Where such lines and transparent areas are employed it is possible to prepare discs having an extremely large number of radial lines thereon. As an example, discs may be utilized which have one thousand radial lines thereon of approximately 4 thousandths of an inch width with the lines in a band about one-half inch wide around their common center.

The axes of the discs 74 and 76 in Figure 5 are shown as being displaced by a distance D equal to the width of the arcuate segments 82 and 84. It is also possible to displace the axes by still greater distances and when this is done larger numbers of shadow bands are produced. Thus referring to Figure 8 there is shown the interference pattern which develops when a pair of discs have their axes spaced by a distance equal to twice the width of the arcuate segments. With this arrangement four dark areas 104, 106, 108 and 110 are produced along with four light areas 112, 114, 116 and 118. Further increases in axis spacings, as to three or four segment widths, produces still larger numbers of shadow bands. The speed of rotation of the interference patterns is inversely proportional to the spacing between the disc axes and may be further geared down through the use of discs having unequal numbers of opaque and transparent areas thereon.

Referring to Figure 10 there is seen an apparatus for utilizing the signals from the two photocells for directional counting. The photocells 32 and 34 are connected through amplifier 54 to triggers 122 and 124, respectively, which triggers are commonly known as Schmitt triggers and are illustrated at page 100, Figure 2.37 in "Electronics, Experimental Techniques" by William C. Elmore and Matthew Sands, first edition (1949). Triggers 122 and 124 are of the bi-stable flip-flop type which have two input voltage levels through which the triggering voltage must pass in order to accomplish the desired action. These trigger levels are indicated by lines G and H applied to the curves A and B of Figure 11 which illustrates respectively the actual voltage output of photocells 32 and 34 after amplification. It is understood that the output of photocells 32 and 34 are connected to only one tube of the triggers 122 and 124 respectively.

When the voltage of photocell 32 rises to level G, the connected tube of trigger 122 will start to conduct and will remain in conducting condition until the voltage of photocell 32 passes through its maximum and returns to trigger level H. On curve A the X points represent the triggering points for this tube. The output of the connected tube is therefore illustrated by curve C of Figure 11. When the connected tube of trigger 133 ceases to conduct the other tube of the trigger starts to conduct and remains conducting until the voltage of photocell 32 again rises to trigger level G. The voltage output of the other tube is therefore illustrated by curve D of Figure 11 and it is seen that the usual trigger action has resulted in that only one tube of the trigger is conducting at any given time.

Figure 11:
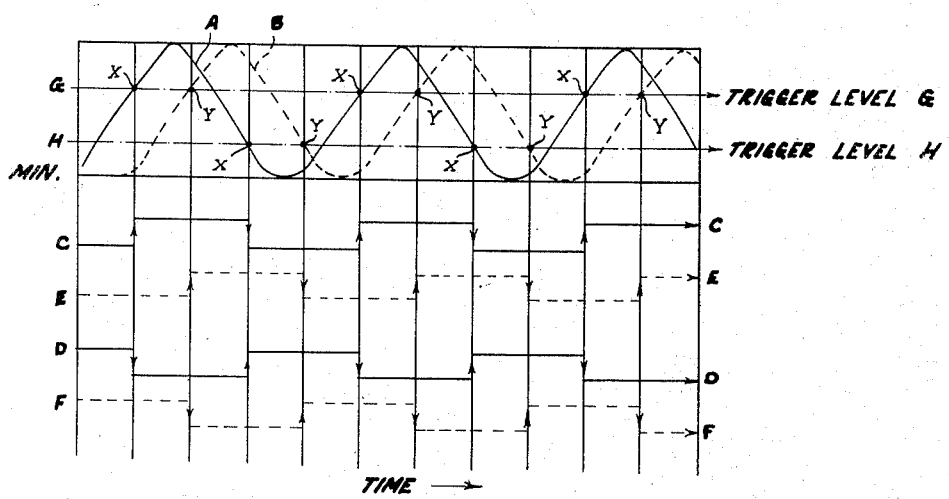
Figure 11 illustrates the output of triggers which are connected to each photocell and also the position of the trigger levels in relation to the output curves of the photocells.

The dashed curve B of Figure 11 illustrates the amplified voltage output of photocell 34 and when this output reaches trigger level G, the connected tube of trigger 124 starts to conduct and remains conducting until the voltage of photocell 34 returns to trigger level H. The curve E of Figure 11 illustrates the output voltage of the connected tube of trigger 124 and points Y on curve B designate the triggering points. When the connected tube ceases to conduct, the other tube of the trigger is in conducting condition until the voltage of photocell 34 again rises to trigger level G. The curve F illustrates the voltage output of the non-connected tube of trigger 124. It is apparent that one cycle of each photocell causes one positive going pulse and one negative going pulse in each line leading from the connected trigger.

Referring again to Figure 10, the lines C, D, E and F carry the output of triggers 122 and 124 and the output of each line corresponds to the curve of similar designation shown in Figure 11. Both lines C and D are directly connected to a mixer 126 which allows the signals in either line to pass through the delay unit pulser 128 and into the counter 130. Thus, both the signals in lines C and D may be used to count the number of light areas which pass the photocell 32 since two positive counting pulses are generated in the trigger 122 for each light area which passes the photocell 32.

The mixer 126, commonly known as an Adder, may be of the type which utilizes tubes in the manner illustrated in Figure 18.12 at page 641 of "Waveforms," volume 19 of Radiation Laboratory Series of Massachusetts Institute of Technology, first edition (1949). Other types of mixers which utilize resistors, capacitors, or diodes may equally well be used. The delay unit pulser 128 may be in the form of a mono-stable multi-vibrator, of which there are numerous types, a typical one being illustrated in Figure 5.10, page 168 of the reference cited directly above.

The output of lines E and F coming from photocell 34 may be used to determine which direction the disc is rotating during the time the pulses from photocell 32 are being counted. A series of four gates 132, 134, 136 and 138 are utilized for this purpose and the voltage level of line F is used to control gates 132 and 134 while the voltage level of line E is used to control gates 136 and 138. Also line D is connected to gates 132 and 138 while line C is connected to gates 134 and 136. The gates 132 and 136 have a common output line 140 and the gates 134 and 138 have a common output line 142. These lines lead to the directional control unit for the counter and then to the interstages of the counter where the signals control the bias level of two gates at each interstage.

The operation of the directional control gates is more readily understood in connection with Figure 11. A typical construction for such gates is shown in Figure 10.16, page 379 of the reference entitled "Waveforms" cited above, where the inputs from trigger 124 would be connected directly to voltage source Eg3 in the illustration. When the voltage level of line E jumps to its high positive level, the gates 136 and 138 are in a condition to conduct. If a negative going pulse is received in line C from trigger 122, the pulse cannot pass through the gate 136 and on to the directional control unit since the gates respond to positive pulses only. However, at the same time line D receives a positive going pulse which is allowed to pass through the gate 138 to line 142 and on to unit 144. Since the line F is at a low voltage during the time line E is at high voltage, no pulses can pass through gates 132 or 134. When line F goes to its high positive level, however, then gates 132 and 134 are conditioned to conduct, and a positive going pulse in line C passes through gate 134 and the negative going pulse in line D cannot pass through gate 132. Therefore, another pulse passes through line 142 to the directional control unit. It is therefore apparent that when the disc 62 is rotating in a direction so that curve A of photocell 32 leads curve B of photocell 34, all directional pulses received by control unit 144 come from line 142. This results when line F is at high voltage and line C receives a positive going pulse or when line E is at high voltage and line D receives a positive going pulse.

If the direction of rotation of disc 62 is reversed, the curve B for photocell 34 then leads the curve A for photocell 32. In this condition, when line E is at its high voltage, gates 136 and 138 become conductive. Because of the change in phase of the curves A and B, line C receives a positive going pulse and line D receives a negative going pulse at this time. The gate 136 therefore allows the positive going pulse of line C to pass on through line 140 to the directional control unit while the negative going pulse of line D cannot pass gate 138. During this time line F is at low voltage and gates 132 and 134 are non-conductive. However, when line F is at its high voltage and line E at low voltage gates 132 and 134 are made conducting. At this time line D receives a positive going pulse from trigger 122 which passes through gate 132 to line 140 and to unit 144. Line C at this time has a negative going pulse thereon which is not able to pass through gate 134. It is therefore apparent that when disc 62 is rotating in the reversed direction, then all directional control pulses pass through line 140. When line E is at the high conducting voltage, a positive going pulse in line C passes through gate 136 and line 140 and when line F is at a conducting voltage, the positive going pulse in line D passes through gate 132 to line 140.

Since, for a given direction of rotation of disc 62, the directional control pulses can only pass through one of the lines 140 or 142, the control pulse in this one line opens the proper gate at each interstate of the counter 130 so that the pulse coming from the delay unit pulser 128 can be made to count in the proper direction. The delay unit pulser 128 delays the pulse from mixer 126 until the pulse from the directional control unit 144 has had time to open the proper interstate counting gates.

The directional control unit 144 may utilize a bi-stable trigger cathode follower output such as shown in Figure 5.4, page 164 of the reference entitled "Waveforms," cited above, with the two inputs to V-3 and V-4 separated instead of joined. While the positive going pulses have described as the counting pulses, it is contemplated that the negative pulses could be used for the same purpose. Also the phase relationship of the amplified photocell curves is not critical as long as the curves are not 180° out of phase.

It will be obvious that the number of counts obtained for each light area in the rotating interference pattern may be doubled without increasing the number of photocells in use. In order to accomplish this result, four additional gates 146, 148, 150 and 152, may be added to the circuit of Figure 10 in the manner shown in Figure 12. In this circuit, the voltage pulses from trigger 124 are also added to mixer 126 through lines I and J, respectively. Therefore, a total of four counting pulse lines are led to the mixer 126 instead of only the two leading from trigger 122. The voltage levels of gates 146 and 148 are controlled by line L which connects with line D of trigger 122 and the voltage levels of gates 150 and 152 are controlled by line K which is connected with line C of trigger 122. Therefore, when a positive going pulse is obtained in line E, the line C will have jumped to its high positive level and the pulse from line E allowed to pass through gate 152 to line 154. At the same time a negative going pulse in line F is not able to pass gate 150. Thus, only the pulse from gate 152 is able to pass line 154 to the directional control unit 144. However, when the line F receives a positive going pulse, the line D has previously jumped to its high positive level and the gates 146 and 148 are in condition to conduct and this positive going pulse can pass through gate 146 and on to line 154. At this time gate 148 will not pass the negative going pulse in line E and gates 150 and 152 will not be opened since line C is below firing potential.

During the period that line 154 receives directional pulses, line 142 also receives alternate directional pulses indicating the same direction of movement and directional control is available for all four of the positive pulses received at the mixer 126. If the direction of rotation of discs 62 is reversed, the gates 132 and 136 and gates 148 and 150 pass the directional pulses indicating the reverse direction are available for each pulse received by the mixer.

The device incorporating this invention may obviously follow the function of any machine or instrument which is of interest and by imparting this function to the disc 62 as rotational movement, it becomes possible to determine the position representing the function at any time. By sending the signals developed by the invention to a suitable type of counter, a digital count of position may be always available since the direction of counting can be quickly reversed. If desired, the position of a number of machine elements may be obtained simultaneously by using separate devices to follow each element. It is apparent that the use of the generated signals is not limited to indicating means since the signals can be utilized in a number of other ways, such as in connection with servo mechanisms. While the invention has been described incorporating photocells to produce signals, it is contemplated that any other suitable type of light sensitive device may be utilized for this purpose.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a device for generating signals in response to movement of an element movable in more than one direction, a member moved in response to movement of said element, a series of elongated light permeable areas arranged on said member, the sides of adjacent light permeable areas being substantially parallel, a second member arranged in juxtaposition to said first named member and having a series of elongated light permeable areas arranged therein in juxtaposition to at least a portion of said light permeable areas in said first named member, the sides of adjacent light permeable areas in said second member being substantially parallel, at least a portion of said light permeable areas in said second member angularly overlying some of said light permeable areas in said first named member, a pair of spaced photocells placed on one side of said members and a light source positioned on the other side, said light permeable areas being positioned to allow first one photocell and then the other to receive maximum illumination through overlying light permeable areas during movement of said first named member.

2. In a device for generating signals in response to movement of an element movable in more than one direction, a member moved in response to movement of said element, a series of elongated light permeable areas arranged on said member, the sides of adjacent light permeable areas being substantially parallel, a fixed member arranged in juxtaposition to said movable member and having a series of elongated light permeable areas arranged therein in juxtaposition to at least a portion of said light permeable areas in said movable member, the sides of adjacent light permeable areas in said fixed member being substantially parallel, at least a portion of said light permeable areas in said fixed member angularly overlying some of said light permeable areas in said movable member, a pair of spaced photocells placed on one side of said members and a light source positioned on the other side, said light permeable areas being positioned to allow first one photocell and then the other to receive maximum illumination through overlying light permeable areas during movement of said movable member.

3. In a device for generating signals in response to movement of an element movable in more than one direction, a member rotated in response to movement of said element, a series of light permeable areas arranged in a circular band on said member, a second member arranged in juxtaposition to said rotatable member and having a series of light permeable areas arranged therein on the circumference of a circle having a center spaced from the center of rotation of said rotatable member, a pair of spaced photocells placed on one side of said members and a light source positioned on the other side, said light permeable areas being positioned to allow first one photocell and then the other to receive maximum illumination through overlying light permeable areas during rotation of said rotatable member.

4. In a device for generating signals in response to movement of an element movable in more than one direction, a member rotated in response to movement of said element, a series of light permeable areas arranged in a circular band on said member, a fixed member arranged in juxtaposition to said rotatable member and having a series of light permeable areas arranged therein on the circumference of a circle having a center spaced from the center of rotation of said rotatable member.

5. In a device for generating signals in response to movement of an element movable in more than one direction, a member rotated in response to movement of said element, a series of radial light permeable areas arranged in a circular band on said member, a fixed member arranged in juxtaposition to said rotatable member and having a series of radially arranged light permeable areas therein, said light permeable areas lying on the circumference of a circle having a center spaced from the center of rotation of said rotatable member, a pair of spaced photocells placed on one side of said members and a light source positioned on the other side, said light permeable areas being positioned to allow first one photocell and then the other to receive maximum illumination through overlying light permeable areas during rotation of said rotatable member.

6. In a device for generating signals in response to movement of an element movable in more than one direction, a disc rotated in response to movement of said element, a series of elongated radial light permeable areas arranged in a circular band on said disc, a fixed member arranged in juxtaposition to said rotatable member and having a series of elongated radially arranged light permeable areas therein, said light permeable areas lying on the circumference of a circle having a center spaced from the center of rotation of said rotatable member, a pair of spaced photocells placed on one side of said members and a light source positioned on the other side, said light permeable areas being positioned to allow first one photocell and then the other to receive maximum illumination through overlying light permeable areas during rotation of said rotatable member.

7. In a device for generating signals in response to movement of an element movable in more than one direction, a first member rotated in response to movement of said element, a series of elongated radial light permeable areas of equal width arranged in a circular band on said first member and separated by opaque areas of approximately the same width as said light permeable areas, a second member arranged in juxtaposition to said rotatable member and having a series of elongated radially arranged light permeable areas of equal width arranged on the circumference of a circle having a center spaced from the center of rotation of said rotatable member, said light permeable areas being separated by opaque areas of approximately the same width as said light permeable areas.

8. A device as set out in claim 7 wherein the number of light permeable areas on said disc is equal to at least 1000.

9. A device as set out in claim 7 wherein the spacing between said center of said circle and said center of rotation is at least the width of one of said light permeable areas.

10. In a device for measuring angular displacement of an element movable in more than one direction comprising in combination: a fixed disc of opaque material and a rotatable disc of opaque material in overlapping relation, radial light permeable areas in said fixed disc, radial light permeable areas in said rotatable disc having a center eccentrically spaced from the center of said radial light permeable areas in said fixed disc, and means for causing light to pass through the intersection of said light permeable areas.

References Cited in the file of this patent

UNITED STATES PATENTS 2,685,082     Berman et al.   ----------   July 27, 1954